(12) United States Patent
Trede

(10) Patent No.: US 8,450,871 B2
(45) Date of Patent: May 28, 2013

(54) POSITIONING OF A ROTOR OF A WIND POWER PLANT

(75) Inventor: Alf Trede, Immenstedt (DE)

(73) Assignee: Repower Systems SE, Hamburg (DE)

( * ) Notice: Subject to any disclaimer, the term of this patent is extended or adjusted under 35 U.S.C. 154(b) by 443 days.

(21) Appl. No.: 12/436,527

(22) Filed: May 6, 2009

(65) Prior Publication Data

US 2009/0278359 A1 Nov. 12, 2009

(30) Foreign Application Priority Data

May 6, 2008 (DE) .......................... 10 2008 022 383

(51) Int. Cl.
*F03D 11/00* (2006.01)
*F03D 11/02* (2006.01)
(52) U.S. Cl.
CPC ..................................... *F03D 11/00* (2013.01)
USPC .............................. 290/55; 416/162; 290/4 R
(58) Field of Classification Search
CPC ........................................................ F01D 25/36
USPC .......................................... 290/55; 416/162
See application file for complete search history.

(56) References Cited

U.S. PATENT DOCUMENTS

| | | | | |
|---|---|---|---|---|
| 3,919,894 A | * | 11/1975 | Keeter et al. .................... | 74/384 |
| 3,960,028 A | * | 6/1976 | Martin ............................. | 74/405 |
| 4,083,259 A | * | 4/1978 | Seliger et al. ................... | 476/12 |
| 4,527,072 A | * | 7/1985 | van Degeer ..................... | 290/55 |
| 5,741,965 A | | 4/1998 | Hernandez et al. | |
| 7,397,145 B2 | * | 7/2008 | Struve et al. .................... | 290/55 |
| 7,649,277 B2 | * | 1/2010 | Nitzpon et al. .................. | 290/55 |
| 7,866,234 B2 | * | 1/2011 | Smart et al. ..................... | 81/57.3 |
| 2006/0163882 A1 | * | 7/2006 | Brandt ............................ | 290/44 |
| 2006/0196288 A1 | | 9/2006 | Aust et al. | |
| 2007/0057515 A1 | * | 3/2007 | Daniels .......................... | 290/44 |

FOREIGN PATENT DOCUMENTS

| | | |
|---|---|---|
| DE | 10031473 C1 | 2/2002 |
| DE | 10334448 | 2/2005 |
| DE | 10334448 B4 | 2/2005 |
| DE | 10357026 B3 | 6/2005 |
| EP | 1167754 | 1/2002 |
| EP | 1659286 | 5/2006 |
| EP | 1659286 A1 | 5/2006 |
| EP | 1895158 | 3/2008 |
| GB | 2266354 * | 10/1993 |
| GB | 2429342 | 2/2007 |
| WO | 2005/090780 | 9/2005 |
| WO | 2007/033671 | 3/2007 |

* cited by examiner

*Primary Examiner* — Burton Mullins
(74) *Attorney, Agent, or Firm* — Rankin, Hill & Clark LLP

(57) ABSTRACT

The invention relates to a wind power plant (W) with a rotor, which is in operative connection with a gearbox (13) via a rotor shaft (12), wherein in particular the gearbox (13) is in operative connection with a generator via a main drive (19). Moreover, the invention relates to a method for the operation of a wind power plant (W) with a rotor and use of a driving device. The wind power plant (W), with a rotor, is further established in that the gearbox (13) has an auxiliary drive (30) and in that a rotor positioning rotating device (24) is arranged on the auxiliary drive (30) so that using the rotor positioning rotating device (24) and the auxiliary drive (30) of the gearbox (13), the rotor of the wind power plant (W) is positioned, and wherein the auxiliary drive (30) cannot be switched within the gearbox (13).

15 Claims, 2 Drawing Sheets

POSITIONING OF A ROTOR OF A WIND POWER PLANT

BACKGROUND OF THE INVENTION

1. Field of the Invention

The invention relates to a wind power plant with a rotor, which is in operative connection with a gearbox via a rotor shaft, wherein in particular the gearbox is in operative connection with a generator via a main drive. Moreover, the invention relates to a method for the operation of a wind power plant with a rotor and use of a driving device.

2. Description of Related Art

In the case of wind power plants, the rotors of the wind power plant are connected with the gearbox and the generator via a drive train. The wind power plant hereby generally has a rotor shaft, on one end of which the rotor shaft is coupled with the rotor and on the other end of which the rotor shaft is coupled with the gearbox. The rotor blades of the wind power plant are fastened on a rotor hub, which is in turn connected with the rotor shaft. The rotational movement of the rotor is transferred to the gearbox via the rotor shaft so that the gearbox is in operative connection with a generator via a generator-side output of the gearbox.

In the case of generic wind power plants, the gearbox can be single- or multi-stage, wherein the gearbox generally has a planetary stage.

For example, DE-B-103 57 026 describes a wind power plant with a rotor, which is coupled with a gearbox via a hollow rotor shaft, the gearbox being in drive connection with a generator.

Moreover, rotor rotating devices for rotors of wind power plants are known that are used to rotate drive trains of the wind power plants with a slow rotational speed.

For example, a device for the rotation of a shaft of a wind power plant connected or coupled with a rotor is known from DE-C-100 31 473, wherein a hand-actuated tool or a motor-driven tool, e.g. a boring machine or drill machine, is provided for the generation of the rotational movement of the rotor.

Moreover, a so-called turning device for the rotation of a drive train of a wind power plant is known from EP-A-1 659 286.

Moreover, a wind power plant with a rotor for driving a generator is known from DE-B-103 34 448, wherein another drive is provided as a rotating device. The rotating device can be coupled with or decoupled from drive elements of the wind power plant when loaded.

Based on this state of the art, the object of the present invention is to enable in a simple manner a rotation and positioning of a rotor during the maintenance phase of a wind power plant, wherein the constructive design should be kept as small as possible.

BRIEF SUMMARY OF THE INVENTION

The object is attained by a wind power plant with a rotor, which is in operative connection with a gearbox via a rotor shaft, wherein in particular, the gearbox is in operative connection with a generator via a main drive, which is further established in that the gearbox has an auxiliary drive and in that a rotor positioning rotating device can be or is arranged on the auxiliary drive so that the rotor of the wind power plant can be or is or will be positioned using the rotor positioning rotating device and the auxiliary drive of the gearbox, wherein the auxiliary drive cannot be switched within or outside of the gearbox.

The invention is based on the idea of arranging a drive device on an existing auxiliary drive on the gearbox of a wind power plant or using a drive device already provided on the auxiliary drive of the gearbox as a rotor positioning rotating device and/or rotor rotating device during a maintenance phase so that through the activation of the drive device, a rotor is rotated into a specified maintenance position during the standstill of the wind power plant for maintenance purposes in order to lock, if applicable, the rotor into an appropriate position. The rotating device is thereby engaged with or is in operative connection with the auxiliary drive so that a torque is transferred to the rotor via the gearbox and the rotor shaft through the rotor positioning rotating device engaged with the auxiliary drive in the maintenance state of the wind power plant so that the rotor is rotated into a predetermined position. This enables access to the rotor hub and inspection of rotor blades, wherein a rotor blade is horizontally aligned in the maintenance position of the wind power plant. In particular, drive devices already provided or existing on the auxiliary drive are used or employed as a rotor rotating device and/or rotor positioning rotating device, whereby corresponding structural alteration measures are not needed on the auxiliary drive of the gearbox.

During the standstill phase of the rotor or the wind power plant for maintenance purposes, in which no energy is generated, a torque is transferred to the rotor hub with the rotor blades upon activation of the auxiliary drive by the rotor positioning rotating device via the gearbox and the rotor shaft so that the rotor is rotated into a corresponding maintenance position. A rotor rotating device for rotors of wind power plants is thus provided, wherein the drive train is rotated with a slow rotational speed for the positioning and rotation of the rotor.

It is known that the switching devices according to the state of the art in the auxiliary device within the gearbox are maintenance-intensive and trouble-prone and are thus not suitable in particular for offshore wind power plants. Since the auxiliary drive is thus driven over the entire service life of the wind power plant, it should be designed for the same number of operating hours as the main drive. In order to not have to design the entire rotor rotating device for the entire service life, which can be expensive, the variants described in the dependent claims provide drive devices only for maintenance use or alternatively provide a switching device outside of the gearbox.

It is furthermore provided that an, in particular, gearbox-external drive is provided for the rotor positioning rotating device. This drive can for example be temporarily arranged on the auxiliary drive, i.e. for a certain period of time, during the maintenance phase in order to rotate the gearbox and the entire drive train via the auxiliary drive. For example, the drive can be designed in the form of a power screwdriver or suchlike so that this power screwdriver is carried as a tool by maintenance personnel and is coupled with the auxiliary drive for purposes of maintaining the rotor. This power screwdriver is for example designed as an electrically operated torque screwdriver.

In another embodiment, it is also provided that the drive is or will be coupled with the part of the rotor positioning rotating device to be driven by means of a power transmission device, wherein a temporarily designed turning drive or adjustment drive is designed for the rotor while the maintenance work is being performed.

In particular, the drive and the part of the rotor positioning rotating device to be driven or driven by the drive are or will be coupled or connected with each other via at least one adapter so that, for example, the drive of the rotor positioning rotating device is arranged in a temporarily detachable manner on the part to be driven for rotor positioning. After the maintenance work has been performed, the drive or the drive motor for the rotor positioning rotating device is disassembled or disconnected so that the drive, for example in the form of a torque screwdriver or suchlike, can be mounted on another wind power plant or on another gearbox of a wind power plant in a detachable manner or flanged on a part of another rotating device to be driven. This results in simple operation of this type of torque screwdriver.

Furthermore, simple operation is achieved in that the adapter has an overload limiting device, in particular an overload coupling so that the torque of a power screwdriver or a torque screwdriver is achieved through the setting of a predetermined torque. When the applied torque is exceeded, a mechanical separation is achieved between the drive and the driven part of the rotor positioning device. This can e.g. occur when sudden strong gusts of wind counteract the provided rotor positioning.

Advantageously, the rotor positioning rotating device has a conveyor device, in particular an oil pump, conveying a medium as the part to be driven. Hereby, during the maintenance phase, a torque is transferred to the rotor shaft and the rotor via the auxiliary drive, whereby the rotor is slowly rotated into a maintenance position using the gearbox oil pump arranged on and driven by the drive train or the gearbox, which supplies the gearbox with oil during the energy generation phase. It is hereby achieved that corresponding torques are transferred to the gearbox and the rotor shaft and the rotor arranged on it by the driven pump using existing gearbox oil conveying devices, which provide a direct engagement of the auxiliary drive with a gearbox stage.

In another embodiment, the drive is designed as a hydraulic or electrical motor such that, for example, a torque screwdriver or power screwdriver is coupled with a gearbox oil pump or an oil pump of the gearbox and the rotor is thus rotated into a maintenance position via the pump and the auxiliary drive of the rotor.

Moreover, it is provided in an advantageous embodiment that a torque supporting device is provided for the drive, wherein in particular the drive is or will be supported on the gearbox and/or an, in particular fixed, component by means of the torque supporting device.

The wind power plant is also characterized in that the drive is or will be connected with a control device of the wind power plant, in particular a turbine control device, such that an exact position of the rotor in the maintenance position is achieved through the integration of the drive into the operating control system of the wind power plant and operating errors are also thereby avoided. For this, a plug for example can be provided on the so-called top box supplying power to the drive.

It is also advantageous that the rotor is or will be locked in place by means of a locking device, in particular after the rotor has been positioned, in order to perform maintenance work.

Moreover, the object is attained by a method for the operation of a wind power plant with a rotor, wherein during a maintenance phase, i.e. during a standstill of the wind power plant, the rotor in operative connection or coupled with a gearbox is positioned using an auxiliary drive of the gearbox by means of a rotor positioning rotating device coupled with the auxiliary drive, wherein the auxiliary drive is not switched within or outside of the gearbox. Within the framework of the invention, the auxiliary drive is understood as a drive of a gearbox, which is designed next to or in addition to the already existing main drive between the gearbox and the generator. The power flow between the rotor and the generator is formed through the main drive. A branching of the power flow within the gearbox housing is thus achieved through the auxiliary drive.

Furthermore, the rotor is positioned and/or locked in a predetermined maintenance position after a rotation by means of the rotor positioning rotating device.

Moreover, the part of the rotor positioning rotating device to be driven is preferably driven by means of an, in particular gearbox-external, preferably hydraulic or electric, drive, wherein in one embodiment the drive as a mobile drive is temporarily attached to the auxiliary drive of the gearbox for the performance of maintenance work or for the rotation of the rotor into a predetermined maintenance position.

For this, it is also provided that the drive is coupled for a predetermined period of time, in particular during the maintenance phase, to the part of the rotor positioning rotating device to be driven, preferably by means of a power transmission device. In one embodiment, the power transmission device is here designed as an adapter so that the drive is arranged in a detachable manner on the part of the rotor positioning rotating device to be driven.

Alternatively, it is provided to arrange a switching device outside of the gearbox, with which the driving part of the rotor rotating device can be separated from the auxiliary drive. In this case, a preferred embodiment provides that the driven part can permanently remain on the gearbox. Due to the fact that the drive can be decoupled outside of the gearbox, it is not subject to the wear and tear over the entire service life of the wind power plant.

Preferably, the drive of the rotor positioning rotating device is also held or mounted in a torque-supported manner for example on the auxiliary drive or on the housing of the gearbox.

Simple operation is also achieved in that the drive is controlled by means of a control device of the wind power plant, so that the control of the drive, for example via the operation control system or another control device, is achieved, whereby a failure or an operating error of the rotor positioning rotating device is avoided.

Moreover, the object is attained by the use of a driving device as a rotor positioning rotating device in a wind power plant described above, wherein the driving device engages with an auxiliary drive of the gearbox.

BRIEF DESCRIPTION OF THE DRAWINGS

The invention is described below, without restricting the general scope of the invention, based on exemplary embodiments in reference to the drawings, whereby it is expressly referred to the drawings with regard to the disclosure of all details according to the invention that are not explained in greater detail in the text. The drawings show in.

DETAILED DESCRIPTION OF THE INVENTION

In the following figures, the same or similar types of elements or corresponding parts are provided with the same reference numbers in order to prevent the item from needing to be reintroduced.

Figure 1:
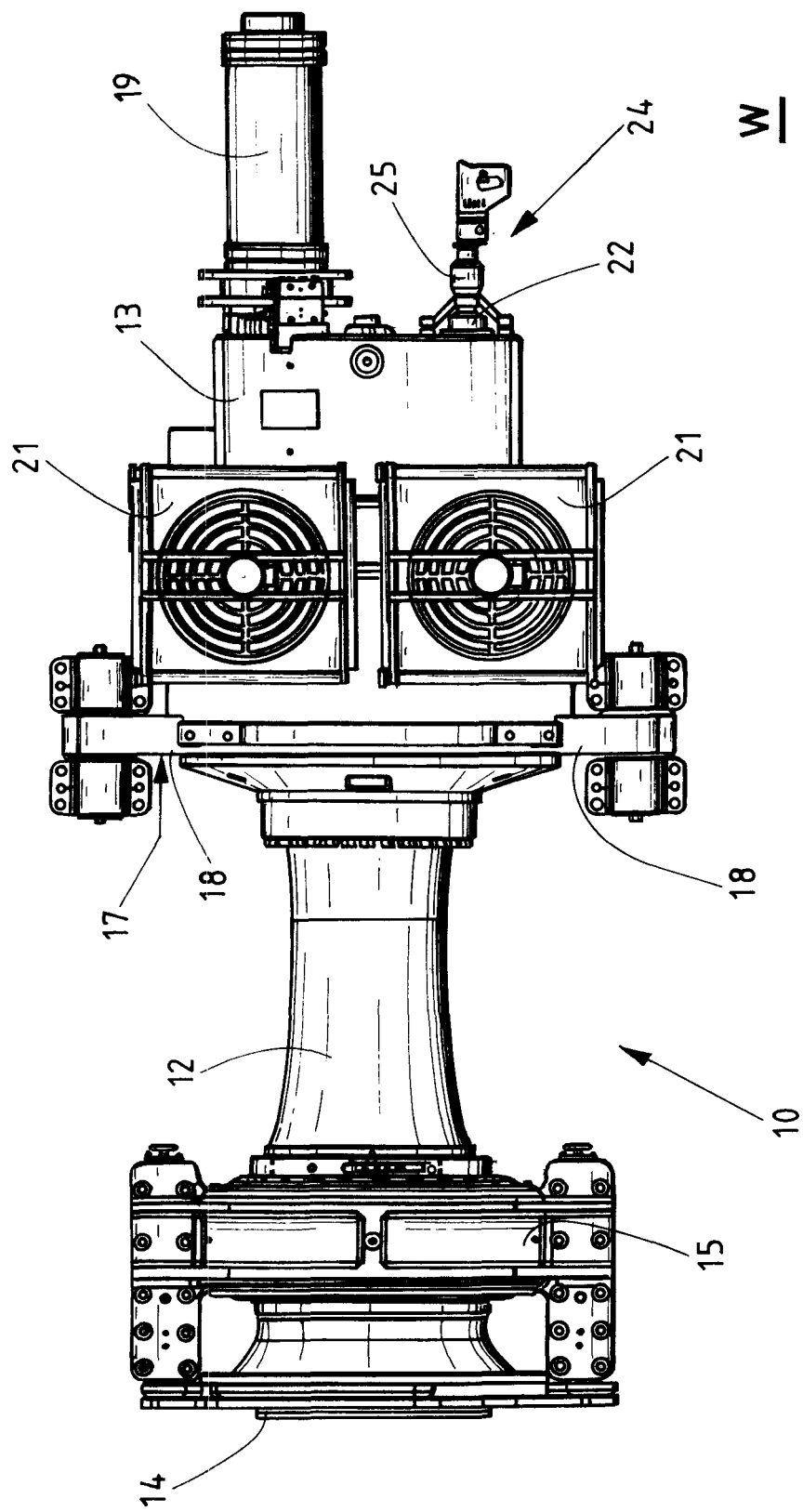
FIG. 1 a view from the top of a drive train of a wind power plant according to the invention and FIG. 2 a detailed view of a rotor positioning rotating device according to the invention.

FIG. 1 shows a view from the top of a drive train 10 of a schematically represented wind power plant W. The drive train 10 consists of a rotor with rotor blades (not shown here), a rotor shaft 12 and a gearbox 13, in particular a planetary gear. The rotor shaft 12 is connected with the rotor via a rotor shaft flange 14. The drive train 10 is mounted on a front rolling bearing or main bearing and a rear gearbox-side rolling bearing (not shown here). The front main bearing or rolling bearing 15 is, for example, arranged as an angle-movable fixed bearing in the area of the front rotor shaft 12. The rear rolling bearing is integrated in the gearbox.

The gearbox 13 is suspended in the area of the rear rolling bearing laterally by means of torque supports 17 arranged on both sides of the generator 13. Through the torque supports 17, the gearbox 13 is coupled with the machine support (not shown) of the wind power plant W.

The torque supports 17 have support arms 18 arranged laterally on the gearbox, which are connected with the machine support (not shown), wherein the coupling of the support arms 18 takes place, for example, with bearing supports via an elastic suspension.

The gearbox 13 is connected with the rotor on the rotor shaft side. Moreover, the gearbox 13 is connected with a generator (not shown here) via an output shaft 19 as the main drive.

Two oil cooling devices 21 are also arranged on the top side of the gearbox 13 in order to lubricate the gearbox wheels of the gearbox 13, wherein the circulated oil is cooled in the oil cooling devices 21.

Furthermore, a gearbox oil pump 22 is provided on the generator-side output side of the gearbox 13 next to the output shaft 19, by means of which the oil is conveyed in the gearbox. For example, the gearbox oil pump 22 is hereby designed as a geared pump, which is used as an oil pump for the transport of oils or lubricating liquids.

No energy is generated in the maintenance state of the wind power plant W so that the rotor of the wind power plant W is not driven. This means that the maintenance work is performed when there is no or only low wind flow or when the rotor blades are rotated completely away from the wind.

While maintenance work is being performed, a drive motor is attached to the gearbox oil pump 22 or a torque screwdriver 25 is attached to the gearbox oil pump 22 so that the spur wheel of the last gearbox stage of the wind power plant is driven using the torque screwdriver 25 and the gearbox oil pump 22 via an auxiliary drive 30 in the gearbox. During the generation of energy, the output shaft 19 is driven by a main drive. There is a power flow between the rotor and the generator through the main drive during energy generation. The output shaft 19 and the generator both rotate during the rotor positioning.

A rotor positioning rotating device 24 is formed through the combination of the torque screwdriver 25 as the drive and the gearbox oil pump 22 as the driven part during the maintenance phase such that through activation of the rotor positioning rotating device 24 via the introduction of torques via the auxiliary gearbox via the rotor shaft 12 a torque is exerted on the rotor shaft 12 such that the rotor of the wind power plant W is rotated into a corresponding maintenance position.

An alternative embodiment provides that the gearbox oil pump is advantageously used directly as a hydraulic drive motor through reversal of the pressure conditions. In this case, only a hydraulic aggregate is mounted on the rotor rotating device as a drive unit for maintenance purposes, which provides pressure oil in order to thereby operate the oil pump in the auxiliary drive of the gearbox as a hydraulic drive motor.

Figure 2:
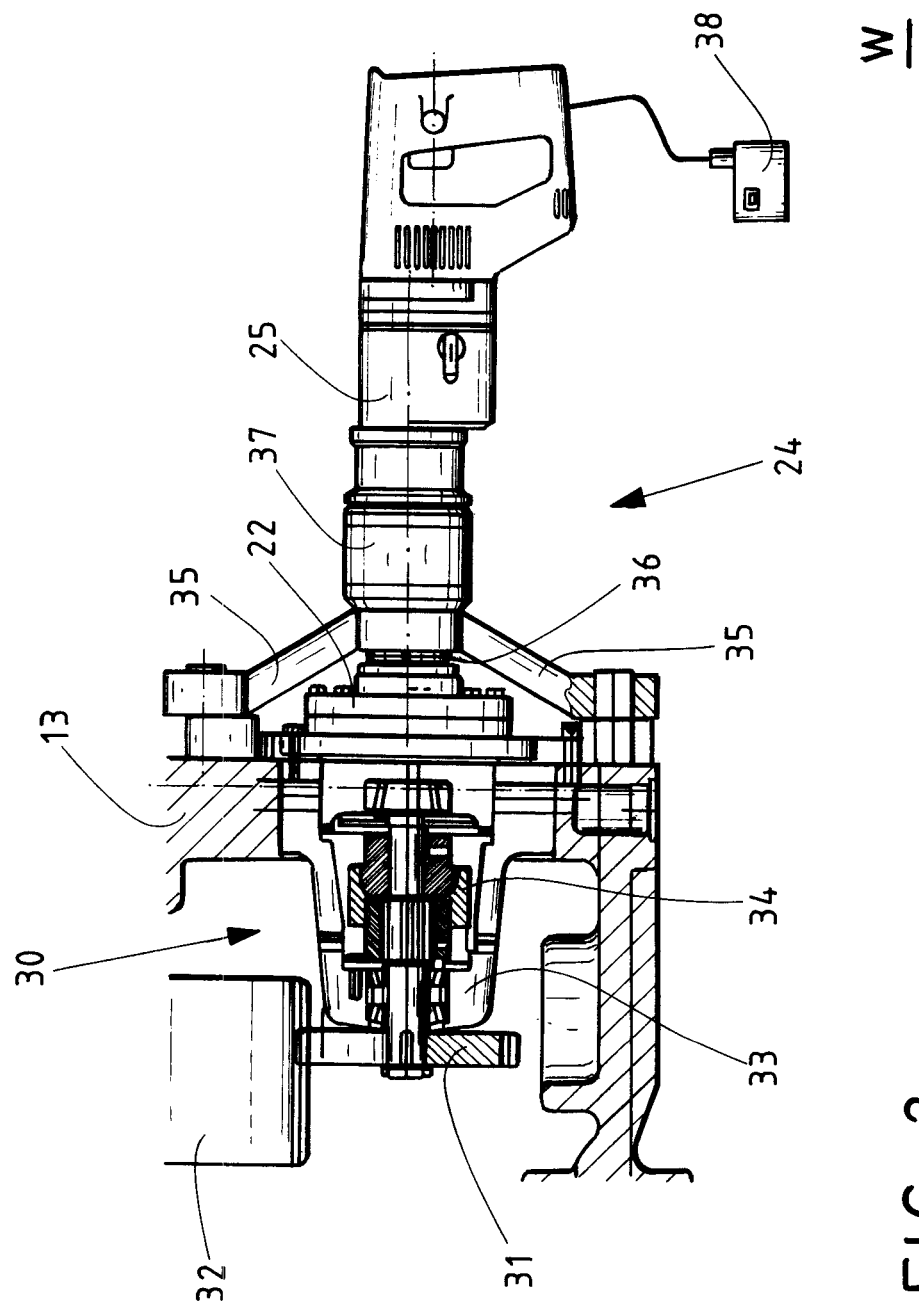

FIG. 2 shows the rotor positioning rotating device 24 in a detailed view.

The gearbox 13 has an auxiliary drive 30, wherein a drive pinion 31 of the auxiliary drive 30 cogs with a spur wheel 32 of the main drive, preferably with the spur wheel of the output stage. The drive pinion 31 is mounted in the housing of the gearbox 13 via a pot-like element 33. Furthermore, the drive pinion 31 is connected or coupled with the gearbox oil pump 22 in the form of a geared pump via a so-called curved tooth coupling 34.

The gearbox oil pump 22 conveys lubricating oil during the energy generation phase or in trundle mode at a low rotor speed and is wired such that the conveyor direction of the gearbox oil pump is independent of the rotational direction of the rotor in order to ensure lubrication of the gearbox even when the rotor is trundling backwards. On the drive side, the gearbox oil pump 22 is coupled with the auxiliary drive 30 by means of the curved tooth coupling 34.

Furthermore, the gearbox oil pump 22 has a free shaft end, wherein a or the hub of the gearbox oil pump 22 or geared pump is extended. An adapter with an intermediate gearbox is attached via a spline 36 on the free shaft end. The intermediate gearbox also has an overload coupling.

A torque screwdriver 25 is inserted into the adapter 37 so that a torque is transferred to the rotor shaft and the rotor during the performance of maintenance work through activation of the torque screwdriver 25 (as drive) and the driven gearbox oil pump 22 and via the drive pinion 31 engaging with the spur wheel so that the rotor is rotated into a maintenance position.

Furthermore, several support arms 35 are arranged laterally on the adapter 37, which are arranged in a detachable connection on the backside of the gearbox 13. The torque screwdriver 25 is held in a torque-supported and/or -secured manner on the auxiliary drive 30 by the support arms 35.

The torque screwdriver 25 is supplied with power via a control device 38 of the wind power plant W, wherein the torque screwdriver 25 is plugged into a plug provided, for example, in the nacelle of the wind power plant. The control device 38 releases the power supply of the rotor positioning rotating device 24 when the wind power plant W is in a maintenance state provided for this. For example, it can be checked whether the wind speed and the wind direction are in the permissible ranges and/or that the electrical network is available and/or that all rotor blade angles of the rotor blades are in the permissible range (e.g. feathering position or also in a 0° operating position). Moreover, it can also be checked whether the yaw drive of the nacelle is functional and whether a service switch is engaged and/or whether the rotor is locked or hard-braked. It can also be checked whether the rotor positioning rotating device is mounted or wired properly.

In one embodiment, the torque screwdriver 25 is removed or disassembled from the gearbox oil pump 22 in normal mode or during energy generation so that the spline 36 designed as a free shaft end is protected with a cover placed on or over the gearbox oil pump 22. In a preferred embodiment, it can thereby be provided that the cover is provided with a sensor, which activates or lets engage the brake systems of the wind power plant upon removal of the cover in order to reduce the risk of injury for the maintenance personnel on the rotating shaft end.

The fixed brake, through which the rotor is held locked in place in the maintenance position, can only be opened when the rotor positioning rotating device 24 is mounted properly by applying the torque screwdriver 25, and the wind power plant W is in a state permissible for rotor positioning. The energy supply for the rotor positioning rotating device 24 can only be released after manual opening of the rotor brake.

LIST OF REFERENCES

10 Drive train
12 Rotor shaft
13 Gearbox
14 Rotor shaft flange
15 Rolling bearing
17 Torque support
18 Support arm
19 Output shaft
21 Cooling device
22 Gearbox oil pump
24 Rotor positioning rotating device
25 Torque screwdriver
30 Auxiliary drive
31 Drive pinion
32 Spur wheel
33 Pot-shaped element
34 Curved tooth coupling
35 Support arm
36 Spline
37 Adapter
38 Control device
W Wind power plant

The invention claimed is:

1. A wind power plant (W) comprising:
a rotor, which is in operative connection with a gearbox (13) via a rotor shaft (12),
wherein the gearbox (13) is in operative connection with a generator via a main drive that is partially outside of the gearbox,
wherein the gearbox (13) has an auxiliary drive (30),
wherein a rotor positioning rotating device (24) is arranged on the auxiliary drive (30) so that the rotor of the wind power plant (W) is positioned using the rotor positioning rotating device (24) and the auxiliary drive (30) of the gearbox (13),
wherein a gearbox-external drive (25) is provided for the rotor positioning rotating device (24),
wherein the gearbox-external drive (25) and a part of the rotor positioning rotating device (24) to be driven, which is driven by the gearbox-external drive, are coupled or connected with each other via at least one adapter (37), and
wherein the adapter (37) has an overload coupling.

2. A wind power plant (W) comprising:
a rotor, which is in operative connection with a gearbox (13) via a rotor shaft (12),
wherein the gearbox (13) is in operative connection with a generator via a main drive that is partially outside of the gearbox,
wherein the gearbox (13) has an auxiliary drive (30), and
wherein a rotor positioning rotating device (24) is arranged on the auxiliary drive (30) so that the rotor of the wind power plant (W) is positioned using the rotor positioning rotating device (24) and the auxiliary drive (30) of the gearbox (13),
wherein a drive pinion of the auxiliary drive (30) cogs with the main drive inside the gearbox,
wherein a gearbox-external drive (25) is provided for the rotor positioning rotating device (24), and
wherein the gearbox-external drive (25) and a part of the rotor positioning rotating device (24) to be driven, which is driven by the gearbox-external drive, are coupled or connected with each other via at least one adapter (37).

3. The wind power plant (W) according to claim 2, wherein the gearbox-external drive (25) is coupled with a part of the rotor positioning rotating device (24) to be driven, which is driven by the gearbox-external drive, also by means of a power transmission device (36).

4. The wind power plant (W) according to claim 2, wherein the rotor positioning rotating device (24) includes an oil pump (22).

5. The wind power plant (W) according to claim 2, wherein the gearbox-external drive (25) is designed as a hydraulic or electrical motor.

6. The wind power plant (W) according to claim 2, wherein a torque supporting device is provided for the gearbox-external drive.

7. The wind power plant (W) according to claim 2, wherein the rotor is locked in place by means of a locking device, after the rotor has been positioned.

8. A wind power plant (W) comprising:
a rotor, which is in operative connection with a gearbox (13) via a rotor shaft (12),
wherein the gearbox (13) is in operative connection with a generator via a main drive that is partially outside of the gearbox,
wherein the gearbox (13) has an auxiliary drive (30),
wherein a rotor positioning rotating device (24) is arranged on the auxiliary drive (30) so that the rotor of the wind power plant (W) is positioned using the rotor positioning rotating device (24) and the auxiliary drive (30) of the gearbox (13),
wherein a gearbox-external drive (25) is provided for the rotor positioning rotating device (24),
wherein the gearbox-external drive (25) and a part of the rotor positioning rotating device (24) to be driven, which is driven by the gearbox-external drive, are coupled or connected with each other via at least one adapter (37), and
wherein the gearbox-external drive (25) is connected with a turbine control device (38) of the wind power plant (W).

9. A method for the operation of a wind power plant (W) with a rotor, comprising the step of:
during a maintenance phase of the wind power plant (W), the rotor in operative connection or coupled with a gearbox (13), comprising an auxiliary drive and a main drive, wherein the main drive is partially outside the gearbox, is positioned using the auxiliary drive (30) of the gearbox (13) by means of a rotor positioning rotating device (24) coupled with the auxiliary drive (30),
wherein the auxiliary drive cogs with the main drive inside the gearbox,
wherein a gearbox-external drive (25) is provided for the rotor positioning rotating device (24), and
wherein the gearbox-external drive (25) and a part of the rotor positioning rotating device (24) to be driven, which is driven by the gearbox-external drive, are coupled or connected with each other via at least one adapter (37).

10. The method according to claim 9, wherein the rotor is positioned and/or locked in a predetermined maintenance position, after rotation, by means of the rotor positioning rotating device (24).

11. The method according to claim 9, wherein the gearbox-external drive is a gearbox-external hydraulic or electrical drive (25).

12. The method according to claim 11, wherein the drive (25) is coupled for a predetermined period of time, during the maintenance phase, to the rotor positioning rotating device (24), by means of a power transmission device (36).

13. The method according to claim 11, wherein the drive (25) for the rotor positioning rotating device (24) is held or mounted in a torque-supported manner.

14. A method for the operation of a wind power plant (W) with a rotor, comprising the step of:

during a maintenance phase of the wind power plant (W), the rotor in operative connection or coupled with a gearbox (13), comprising a main drive and an auxiliary drive, is positioned using the auxiliary drive (30) of the gearbox (13) by means of a rotor positioning rotating device (24) coupled with the auxiliary drive (30), wherein a part of the rotor positioning rotating device (24) to be driven, is driven by means of a gearbox-external hydraulic or electrical drive (25), wherein the gearbox-external hydraulic or electrical drive (25) and a part of the rotor positioning rotating device (24) to be driven, which is driven by the gearbox-external hydraulic or electrical drive, are coupled or connected with each other via at least one adapter (37), and wherein the gearbox-external hydraulic or electrical drive (25) is controlled by means of a control device (38) of the wind power plant (W).

15. A wind power plant (W) comprising:

a rotor, which is in operative connection with a gearbox (13) via a rotor shaft (12), wherein the gearbox (13) is in operative connection with a generator via a main drive that is partially outside of the gearbox, wherein the gearbox (13) has an auxiliary drive (30), and wherein a rotor positioning rotating device (24), comprising an oil pump and a rotating device drive, is arranged on the auxiliary drive (30) so that the rotor of the wind power plant (W) is positioned using the rotor positioning rotating device (24) and the auxiliary drive (30) of the gearbox (13), and wherein the oil pump is driven by the rotating device drive, wherein the oil pump is coupled to the auxiliary drive, wherein the rotating device drive and a part of the rotor positioning rotating device (24) to be driven, which is driven by the rotating device drive, are coupled or connected with each other via at least one adapter (37).

\* \* \* \* \*